(12) United States Patent
Holk

(10) Patent No.: US 10,695,268 B2
(45) Date of Patent: Jun. 30, 2020

(54) COMBINATION BOTTLE HOLDER, BOTTLE HOLDING TRAINER, AND BIB

(71) Applicant: Willow Pillow LLC, Yakima, WA (US)

(72) Inventor: Alicia Michelle Holk, Yakima, WA (US)

(73) Assignee: Willow Pillow LLC, Yakima, WA (US)

( * ) Notice: Subject to any disclaimer, the term of this patent is extended or adjusted under 35 U.S.C. 154(b) by 0 days.

(21) Appl. No.: 16/152,792

(22) Filed: Oct. 5, 2018

(65) Prior Publication Data

US 2019/0105236 A1 Apr. 11, 2019

Related U.S. Application Data

(60) Provisional application No. 62/568,789, filed on Oct. 6, 2017.

(51) Int. Cl.
*A61J 9/06* (2006.01)
*F16M 13/04* (2006.01)

(52) U.S. Cl.
CPC ............ *A61J 9/0638* (2015.05); *A61J 9/0669* (2015.05); *F16M 13/04* (2013.01)

(58) Field of Classification Search
CPC ........ A61J 9/0638; A61J 9/0669; F16M 13/04
USPC ....................................................... 248/104
See application file for complete search history.

(56) References Cited

U.S. PATENT DOCUMENTS

| | | | | |
|---|---|---|---|---|
| 298,985 | A * | 5/1884 | Kimball | A41B 13/103 2/49.2 |
| 1,810,556 | A * | 6/1931 | Fenton | B63C 9/155 441/88 |
| 1,859,123 | A * | 5/1932 | Ballert | A61J 9/0684 248/105 |
| 2,134,746 | A * | 11/1938 | Allen | A61J 9/0684 248/102 |
| 2,336,707 | A * | 12/1943 | Thompson | A47C 7/383 5/636 |
| 2,451,718 | A * | 10/1948 | Corrao | A61J 9/0684 2/49.3 |
| 2,485,461 | A * | 10/1949 | Siegel | A61J 9/0684 248/102 |
| 2,510,953 | A * | 6/1950 | Brose | A61J 9/0684 248/102 |
| D162,793 | S * | 4/1951 | Daust | D2/864 |

(Continued)

*Primary Examiner* — Kimberly T Wood
(74) *Attorney, Agent, or Firm* — Maier & Maier, PLLC

(57) ABSTRACT

A bottle holder apparatus and method of use. The cover of the bottle holder may have a front portion with a bottle holder strap, and may optionally be reversible to a back portion also having a bottle holder strap. The bottle holder may have neck straps, which may be adjustable, and an inner cavity in which a pillow can be disposed, which may support a bottle at a desired feeding angle. This may, in combination with adjustable neck straps, allow for a variety of positions or feeding angles to be defined. In one variation, the pillow and cavity may be U-shaped and centered around a divot, which may provide additional stability to the bottle. The bottle holder strap(s) may have one fixed or relatively fixed end, and one removable end, such that the bottle holder strap(s) can be easily removed and replaced in order to hold a bottle.

19 Claims, 10 Drawing Sheets

(56) References Cited

U.S. PATENT DOCUMENTS

| | | | | |
|---|---|---|---|---|
| 2,552,462 A | * | 5/1951 | Savrin | A41B 13/103 2/49.2 |
| 2,631,288 A | * | 3/1953 | Daust | A41B 13/10 2/49.3 |
| D211,435 S | * | 6/1968 | Kausen et al. | D24/199 |
| 3,905,571 A | * | 9/1975 | Lombardo | A61J 9/0684 248/102 |
| 4,227,270 A | * | 10/1980 | Rivera | A45C 9/00 248/102 |
| 4,236,264 A | * | 12/1980 | Britzman | A47C 7/383 297/393 |
| 4,473,907 A | * | 10/1984 | Maillard | A41B 13/10 150/901 |
| 4,564,957 A | * | 1/1986 | Scharf | A41B 13/00 2/49.2 |
| 4,604,758 A | * | 8/1986 | Grasberger | A41B 13/10 2/49.3 |
| 4,726,551 A | * | 2/1988 | Randall | A61J 9/0638 248/102 |
| 4,809,938 A | * | 3/1989 | Skinner | A61J 9/0607 248/102 |
| D304,777 S | * | 11/1989 | Glenn | D2/863 |
| D324,758 S | * | 3/1992 | Esteves | D2/863 |
| 5,184,796 A | * | 2/1993 | Maher | A61J 9/0669 248/104 |
| 5,312,282 A | * | 5/1994 | Cooper | A41B 13/10 2/49.2 |
| 5,483,701 A | * | 1/1996 | Ferreyros | A41B 13/103 2/247 |
| D379,660 S | * | 6/1997 | Aube | 248/105 |
| 5,765,225 A | * | 6/1998 | Goeckeritz | A41B 13/10 2/49.1 |
| D403,489 S | * | 1/1999 | Cameron | D2/860 |
| 5,898,940 A | * | 5/1999 | Cameron | A41B 13/10 2/48 |
| 5,960,471 A | * | 10/1999 | Burton | A41B 13/103 2/48 |
| 6,000,056 A | * | 12/1999 | Brady | A41B 13/103 2/49.1 |
| 6,000,664 A | * | 12/1999 | Hood | A61J 9/0638 248/102 |
| 6,038,720 A | * | 3/2000 | Matthews | A47C 7/383 5/636 |
| 6,055,667 A | * | 5/2000 | Jimenez | A61J 9/0669 2/49.1 |
| 6,098,934 A | * | 8/2000 | Skelton | A61J 9/0638 248/102 |
| D432,759 S | * | 10/2000 | Krolczyk | D2/860 |
| D444,934 S | * | 7/2001 | Ross | D2/860 |
| 6,523,793 B1 | * | 2/2003 | Higgins | A61J 9/0684 248/102 |
| 6,601,803 B1 | * | 8/2003 | Juranek | A61J 9/0638 248/102 |
| RE38,393 E | * | 1/2004 | Bronson | A41B 13/00 2/102 |
| 6,745,399 B1 | * | 6/2004 | Austin | A41B 13/103 2/49.1 |
| 6,944,898 B2 | * | 9/2005 | Matthews Brown | A47C 7/38 5/632 |
| 6,961,961 B1 | * | 11/2005 | Ezra | A41B 13/10 2/49.1 |
| 7,032,248 B1 | * | 4/2006 | Gutilla | A41B 13/10 2/49.1 |
| 7,080,810 B2 | * | 7/2006 | Munjed | A61J 9/0669 248/102 |
| 7,444,685 B2 | * | 11/2008 | Rose | A41B 13/10 2/49.1 |
| 8,161,571 B1 | * | 4/2012 | Beaupain | A41B 13/10 2/46 |
| 8,321,977 B1 | * | 12/2012 | Kummerfeld | A47D 13/083 5/636 |
| D815,805 S | * | 4/2018 | Davis | D2/861 |
| 2002/0108162 A1 | * | 8/2002 | Bolds-Leftridge | A41B 13/10 2/49.1 |
| 2004/0173557 A1 | * | 9/2004 | Collins | A41B 13/10 215/11.6 |
| 2004/0205876 A1 | * | 10/2004 | Bruffett | A41B 13/103 2/49.2 |
| 2005/0066405 A1 | * | 3/2005 | Babiak | A41D 13/04 2/48 |
| 2011/0309211 A1 | * | 12/2011 | Shakir-Ferguson | A61J 9/06 248/104 |
| 2012/0047618 A1 | * | 3/2012 | Phillips | A41B 13/103 2/49.2 |
| 2012/0117707 A1 | * | 5/2012 | Gay | A41B 13/10 2/49.2 |
| 2013/0019369 A1 | * | 1/2013 | Bailey | A41B 13/10 2/49.2 |
| 2014/0007313 A1 | * | 1/2014 | Adler | A41B 13/103 2/49.2 |
| 2014/0130261 A1 | * | 5/2014 | Gumbrecht | A47C 7/383 5/644 |
| 2016/0113332 A1 | * | 4/2016 | Wilkes | A41B 13/10 2/49.5 |
| 2019/0159526 A1 | * | 5/2019 | Hatcher | A41B 13/10 |

* cited by examiner

COMBINATION BOTTLE HOLDER, BOTTLE HOLDING TRAINER, AND BIB

CROSS-REFERENCE TO RELATED APPLICATIONS

This application claims priority from U.S. Provisional Patent Application No. 62/568,789, filed on Oct. 6, 2017, entitled "3 in 1 Hands Free Baby Bottle Holder, Bottle Holding Trainer and Bib," the entire contents of which are hereby incorporated by reference.

BACKGROUND

Having a new baby is an exciting experience, but it is not without its challenges. One particular challenge that often surprises new parents is how often newborn babies need to feed. Numerous advice guides exist to inform new parents of the heavy responsibilities of breastfeeding their newborns, particularly during the first week of the baby's life.

During these initial stages, a newborn's stomach is very small, around 1 to 2 tsp in size. This will take some time to stretch, but until then, babies frequently need to eat very often, around 8 to 12 times a day, in order to gain weight and grow. As such, babies will often eat every 2 hours, or even more frequently than this. Often, a baby will want several feedings close together until they are satisfied and go to sleep. These are called "cluster feedings," and can occur much more frequently, commonly up to every 20 minutes for some sustained period of time. The length of time that the baby can spend feeding is also somewhat variable and can be very long. For example, some babies can eat for around 45 to 60 minutes several times in a row in short succession, with only small breaks in between, after which they can sleep for several hours. In other cases, babies may only eat for 10 to 15 minutes, but may feed much more regularly, around 30 to 40 minutes around the clock. An average feeding during the first week typically lasts around 20 to 40 minutes with some pauses, with this gradually changing as the newborn ages. Likewise, by the first week, the mother's milk will typically come in in order to provide the baby with more food at each feeding, though it is typically advised to start the baby at the opposite breast at each feeding in order to ensure that the breast does not start out depleted.

Bottle feeding is a little different, with the main difference being that the baby has access to a much larger supply of milk or formula. It is typically advised that parents feed their babies around ½ ounce, or around 2 to 3 teaspoons, of milk or formula per feeding, during the first day. Babies will gradually want to take a little more each day, often around ½ ounce more each day, up to around 3 ounces after the first couple of weeks.

When bottle feeding, it is advised to feed the baby at least 8 times per day, or around every three hours. The baby may have some longer stretches between feedings (up to around 5 hours) and may have shorter stretches during cluster feedings and growth spurts. Parents are also advised to burp their baby at the conclusion of each feeding, or after around each ½ ounce, for the first several weeks. If the baby spits up a large amount of their feeding, this means that the baby may be overeating, need more burping, or need to eat more slowly, each of which may require further intervention from the parents. Just as with breastfeeding, this will change gradually over time as the baby grows.

The frequency with which babies must be fed puts a strain on new parents, who are already struggling with interrupted sleep schedules and trying to accomplish everyday tasks like answering the phone, washing dishes, and making dinner. While this is particularly true for breastfeeding parents, as noted above it can commonly be the case for bottle-feeding parents as well.

Feeding is, of course, not the only challenge that new parents face. One other common challenge for new parents is the financial cost of buying new baby clothes and accessories. It is expected that an average middle-income family will spend upwards of $10,000 per year on child-related expenses, with much of this being new clothes in different sizes, which can easily come to around $1000/year. (A "budget" plan estimates around $60/month, or $720/year, should be spent on clothes; this can easily climb higher.) The old clothes quickly become useless for the baby and do not fit, and therefore are often discarded, donated, or resold. Other accessories, such as strollers or car seats, may also need to be rotated out as the baby grows, depending on what size of baby they can accommodate.

Finally, parents also face the challenge of how to teach their babies and young children useful skills. There is an extremely large market for baby toys or other accessories that serve some developmental purpose, as well as facilitating play; for example, numerous toys advertise that they offer "a great mix of fun and education," or are "science-y toys that help build the developing brainpower of your baby." Functional accessories, too, often serve some developmental purpose or otherwise rely heavily on the ability of the baby. Certain bottle holder designs exist, for example, which rely heavily on the ability of the baby to hold the bottle in place. However, this isn't an option for younger children, who frequently knock their bottles over, defeating the purpose of the holder and often causing a large mess to be made. As discussed above, many accessories also suffer from sizing limitations, based not only on the size of the baby but on the size of the baby's other accessories; if a baby requires a larger bottle, this new larger bottle size may not fit in an existing bottle holder. Likewise, certain bottle shapes may be different and may be incompatible with a certain size of bottle holder. Likewise, many bottle holder options may not permit much movement on the part of the baby or the caregiver, which may be distressing for the baby and may be inconvenient for the caregiver.

SUMMARY

A combination bottle holder, bottle holding trainer, and bib may be disclosed, which may address certain of the problems articulated above. Said bottle holder design may provide parents with a hands-free bottle holder feeding option that fits like a bib, providing a soft, absorbent, machine washable cover and a removable water and stain resistant pillow insert. The bottle holder may function to stabilize baby bottles at an optimal angle for feeding, and may have dual elastic and hook & loop straps on the front and back to fit any size baby bottle. The bottle holder may function in this capacity without the need for an adult or child to hold the bottle, freeing up the parents to perform other tasks if they suddenly need to perform some other activity, such as answer the phone or take a pot or pan off of the stove.

As the baby grows, the baby may be able to use the bottle holder for a new purpose. Specifically, the bottle holder may function as a training tool to teach babies to learn to use their hands to manipulate and control the bottle on their own. The elastic strap design may allow the baby to easily use their hands to retrieve the bottle when they want it and even replace the bottle when they do not want it, or may allow a parent or caregiver to easily do so. The pillow provided in the bottle holder may provide padding to the baby, should they be more aggressive with the bottle when anticipated; for example, it may be envisioned that a baby might flail around with a bottle or other accessory as if it were a rattle, potentially striking it against a surface or against themselves.

(It is noted that the "banging stage" of development typically comes between four and eight months of age; parents are often warned that their baby will begin banging anything they can pick up against everything else in sight, hitting toys against toys, bottles against walls, bowls and silverware against each other or against the floor, and so on. This is an important developmental leap for the baby, showing that they can hold an object and manipulate it to make a sound, but can be distracting and obnoxious to the parent and potentially dangerous to the baby. Parents are warned, for example, that the baby will typically not be able to distinguish between acceptable and unacceptable banging surfaces or objects; a baby may start banging on the glass of a coffee table with all the gusto they would use on a high-chair tray. The pillow may ensure that they are not hurt should they decide to start banging their bottle against anything in sight, including the bottle holder.)

When the child no longer has need for the bottle holder aspect of the product, the pillow insert may be removed and the cover used as a reversible bib. Children will often need a bib for a year or more after they have mastered using their hands to manipulate and control objects, and fully exhausted the entertainment value of banging on things. (Most children outgrow the need for a bib at around three years of age, though this depends on the child.)

According to an exemplary embodiment, such a bottle holder may generally include two major components. A first component may be a removable cover, which may generally resemble a bib and may have an internal cavity. A second component may be a padded insert, which may be, for example, a water-resistant and stain-resistant insert pillow, and which may be insertable in the internal cavity.

Looking first at the removable cover, according to an exemplary embodiment, a removable cover may be a bib having one or more adjustable elastic bands provided on either side. According to an exemplary embodiment, adjustable bands may be provided in a high and a low position on either or both sides; for example, according to an exemplary embodiment, adjustable elastic bands may be provided on a first side in a high position to account for a first bottle size and may be provided on a second side in a low position in order to account for a second bottle size.

In an exemplary embodiment, adjustable elastic bands may be attached to the cover on one side, such as on the right side, using hook and loop material, in order to provide for easy retention of and access to the bottle. This may allow the bottle to be easily placed and adjusted before and while feeding the baby, and may allow the bottle to be easily accessed after the baby has been fed and it is desired to refill the bottle. In an exemplary embodiment, adjustable elastic straps may be attached to the cover on one side via a permanent attachment method, such as via sewing or via a permanent adhesive, and may be removably attached on the other side, such as via a hook-and-loop fastener set, or via magnets sewn into the adjustable elastic straps and the cover which may be configured to magnetically attach to one another. Other variations of permanent attachment methods and removable attachment methods may be contemplated. Likewise, other variations of adjustable elastic strap locations may be contemplated; for example, in one exemplary embodiment, a set of adjustable elastic bands may be provided on one side of the cover, or on each side of the cover, in order to accommodate different sizes of bottles (rather than having one different variation on either side), if desired.

In some exemplary embodiments, the adjustable elastic bands may be modular. For example, in an exemplary embodiment, it may be desirable to arrange the removable cover such that the one or more adjustable elastic bands are arranged in specific locations on the cover. In one example, the one or more adjustable elastic bands may be arranged on one side of the cover, rather than on a front or a back side, such that a bottle may be held at one side of the cover rather than on top of the cover, while in another example the adjustable elastic bands may be arranged on only one side of the cover at a time and taken off of the side that is not currently facing upward. In a third example, adjustable elastic bands may be arranged in multiple locations on the cover, such as in parallel on the front or back side, so that a bottle or other article can be disposed through multiple elastic bands (such as a top band and bottom band) for better retention, if this is desired. For example, in one exemplary embodiment, adjustable elastic bands may have a hook element of a hook-and-loop fastener on either side, with one side designated as a stationary end and one side designated as a removable end. The stationary end may have a hook element which has a much higher peel strength (that is, the force required to separate the hook from the loop when peeling two pieces apart at a 90-degree angle, the most common use case for hook elements) and/or a much higher shear or tension strength when mated to the loop elements provided on the cover, and the removable end may have a hook element which has a much lower peel strength (and/or shear/tension strength) and which therefore is much easier to remove. This may allow the stationary end to be removed only with difficulty, ensuring that it remains in place but can be adjusted by a parent or caregiver if necessary in order to accommodate a larger or smaller bottle size, while the removable end can be more freely adjusted. Other configurations of modular adjustable elastic bands may also be contemplated, such as may be desired; for example, it may be contemplated to have a magnet movable within the lining of the cover, such that an elastic band which itself has a magnet in one end can be coupled to the magnet within the cover at some arbitrary, adjustable location (based on the position of the magnet in the cover), without either magnet presenting a choking hazard. Still other variations of permanently coupled or modular adjustable elastic bands may be contemplated.

Looking again more generally at the removable cover, according to an exemplary embodiment, the cover may have a sewn divot provided in the top center portion of the bib. In certain exemplary embodiments, this sewn divot may create a stabilizing area for the bottle to fit without shifting.

The removable cover may further have a plurality of neck straps, which may be used to retain the bottle holder around the child in order to ensure that the cover fits well and is highly adjustable. The neck straps may be adjustable over a range of positions in order to allow the bottle holder to be used over a long period of the child's life; for example, the cover may be used between when the child is a newborn and when the child is several years old, and as such the neck straps may be sized to fit comfortably around the neck of a newborn in one adjustable position and may be sized to fit comfortably around the neck of a three-year-old (or a child of any other age) in another adjustable position. According to an exemplary embodiment, the neck straps may have multiple fasteners, which may be fastened to one another in any combination in order to achieve a tighter or looser fit for the removable cover around the child. Other variations of a plurality of neck straps, or even a single neck strap, may also be contemplated; for example, in one other potential variation, a neck strap may originate at one side of the upper portion of the removable cover, form a loop intended to fit around a child, and extend back toward the removable cover on the other side of the upper portion. The neck strap may then extend into the removable cover, where it may be held in place with a clasp at a certain position, allowing slack to be added or taken away. In other exemplary embodiments, other variations for a neck strap configuration than the ones described above may also be contemplated.

According to an exemplary embodiment, the removable cover may feature a front and back portion, as well as an angled gusset, which may provide the correct angle for bottle feeding. In an exemplary embodiment, the removable cover (or any other portion thereof) may feature an internal cavity, which may function as a pillow case or envelope for removable padding, and which may be secured by an envelope closure located on the front portion of the removable cover. (Alternatively, in another exemplary embodiment, any other type of closure located anywhere else on the removable cover may be used. It may also be contemplated to not have removable padding, if desired, in which case no closure may be necessary; for example, in an exemplary embodiment, it may be desired to have the removable cover be inflatable, so as to provide an air cushion when inflated and so as to provide a flat-profiled bib when deflated, ensuring that no cushions can be misplaced. Other variations may also be contemplated and may be used as desired.)

In an exemplary embodiment, the removable cover may be machine-washable, and may be constructed from a waterproof and machine-washable material. In certain exemplary embodiments, a removable cover may be washed in a washing machine, a dishwasher, or both, as desired. For example, in certain exemplary embodiments, a removable cover may be constructed from, for example, silicone, polymer, treated fabric, or another such material such as may be desired.

According to an exemplary embodiment, in addition to the removable cover, an insert pillow may be provided. According to an exemplary embodiment, the bottle holder may be configured to accommodate, in an internal cavity of the removable cover, an insert pillow, which may be a stain and water-resistant insert pillow such as may be desired. (This may, for example, allow the insert pillow to be cleaned easily with the wipe of a damp cloth, allowing the pillow to be cleaned without machine washing.) Such an insert pillow may be formed so as to have a divot and angled gusset so as to provide a consistent angle for feeding when the pillow is inserted into the cover.

According to an exemplary embodiment, variations on a stain and water-resistant insert pillow may be contemplated and may be used additionally or instead; for example, in an exemplary embodiment, it may be contemplated to fill an inner cavity of the removable cover with stuffing, with multiple insert pillows, or with any other padded material such as may be desired. This may allow the parent or caretaker some additional control over the angle that may be provided by the pillow when the pillow is inserted into the removable cover, allowing the parent or caretaker to ensure that any bottle is provided at a consistent and optimal angle for feeding.

Various exemplary embodiments of a bottle holder apparatus and method of use may be disclosed. In a first exemplary embodiment, a bottle holder apparatus may include a bottle holder cover, the bottle holder cover having a front face and a back face, and a hollow body portion disposed between the front face and the back face; a plurality of neck straps provided on an upper part of the bottle holder cover, each of the plurality of neck straps provided with a connector configured to be releasably coupled to another of the plurality of neck straps; a bottle holder strap having a first and a second end, the bottle holder strap fixedly coupled on the first end to the front face of the bottle holder cover and removably couplable on the second end to the front face of the bottle holder cover (or alternatively fixed or removable at both ends); and a pillow, the pillow provided within the hollow body portion of the bottle holder cover, such that the pillow provides a sloping rest for a bottle.

In an exemplary embodiment, the bottle holder apparatus may have, on the front face, an orifice extending into the hollow body portion and configured to receive the pillow therethrough. This may be an envelope closure formed from a first sheet and a second sheet, the first sheet having a lip extending in an overlapping fashion over the second sheet.

In an exemplary embodiment, the pillow may have an angled gusset, and may be formed from a stain-resistant and water-resistant material.

In an exemplary embodiment, the bottle holder apparatus may have stitching joining the front face and the back face of the bottle holder cover in an upper part of the hollow body portion; and the pillow may have a U-shape, the concave portion of the U-shape being a narrow opening disposed in an upper top part of the pillow and configured to interface with the stitching such that a portion of the U-shape is disposed on a first side of the stitching and a portion of the U-shape is disposed on a second side of the stitching.

In an exemplary embodiment, the bottle holder apparatus may have a second bottle holder strap having a first and a second end, the second bottle holder strap fixedly coupled on the first end to the back face of the bottle holder cover and removably couplable on the second end to the back face of the bottle holder cover (or alternatively fixed or removable at both ends). In an exemplary embodiment, this second strap may be placed at a different vertical position on the bottle holder cover than the first bottle holder strap. In an exemplary embodiment, a bottle may be retained by the bottle holder strap and held between the first end and the second end of the bottle holder strap.

According to an exemplary method of using a bottle holder apparatus for an infant, with said exemplary bottle holder apparatus including a bottle holder cover with a front face and a back face and a hollow body portion provided between the front face and the back face and adapted to hold a pillow, the bottle holder apparatus further comprising a plurality of neck straps and a bottle holder strap fixedly coupled on at least one end to the front face of the bottle holder cover, this method may include the steps of inserting the pillow into the hollow body portion; coupling a bottle to the bottle holder strap; and coupling the neck straps in place.

According to an exemplary embodiment, the step of inserting the pillow into the hollow body portion may include inserting the pillow through an orifice disposed in the front face of the bottle holder cover, with the orifice extending into the hollow body portion and configured to receive the pillow therethrough. According to an exemplary embodiment, the front face of the bottle holder may further include an envelope closure formed from a first sheet and a second sheet, the first sheet having a lip extending in an overlapping fashion over the second sheet, such that the method includes pulling back the first sheet from the second sheet. The pillow may also be removed from said orifice.

According to an exemplary embodiment, the pillow may have an angled gusset, and the step of inserting the pillow into the hollow body portion may include aligning the angled gusset in a direction of insertion of the pillow.

According to an exemplary embodiment, the bottle holder apparatus may have stitching joining the front face and the back face of the bottle holder cover in an upper part of the hollow body portion, and the pillow may have a U-shape, with the concave portion of the U-shape having a narrow opening disposed in an upper top part of the pillow and configured to interface with the stitching such that a portion of the U-shape is disposed on a first side of the stitching and a portion of the U-shape is disposed on a second side of the stitching. The method may further include aligning the narrow opening with the stitching when inserting the pillow into the hollow body portion. In an exemplary embodiment, the pillow may be formed from a stain-resistant and water-resistant material.

According to an exemplary embodiment, the bottle holder strap may be removably couplable on one end, and the step of coupling the bottle to the bottle holder strap may further include aligning the bottle so that the bottle rests on the front face of the bottle holder in a direction such that a nipple of the bottle is oriented in a direction below a horizontal axis; and coupling the removably couplable end of the bottle holder strap to the front face of the bottle holder.

According to an exemplary embodiment, the device may include a second bottle holder strap having a first and a second end, the second bottle holder strap fixedly coupled on the first end to the back face of the bottle holder cover and removably couplable on the second end to the back face of the bottle holder cover, and the method may further include uncoupling the bottle from the bottle holder strap; rotating the bottle holder so that the front face is oriented in a backward direction and the back face is oriented in a frontward direction; and coupling the bottle to the second bottle holder strap. According to an exemplary embodiment, the second bottle holder strap may be placed at a different vertical position on the bottle holder cover than the first bottle holder strap.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to an exemplary embodiment, and referring generally to the Figures, various exemplary implementations of a combination bottle holder, bottle holding trainer, and bib may be disclosed.

Figure 1:
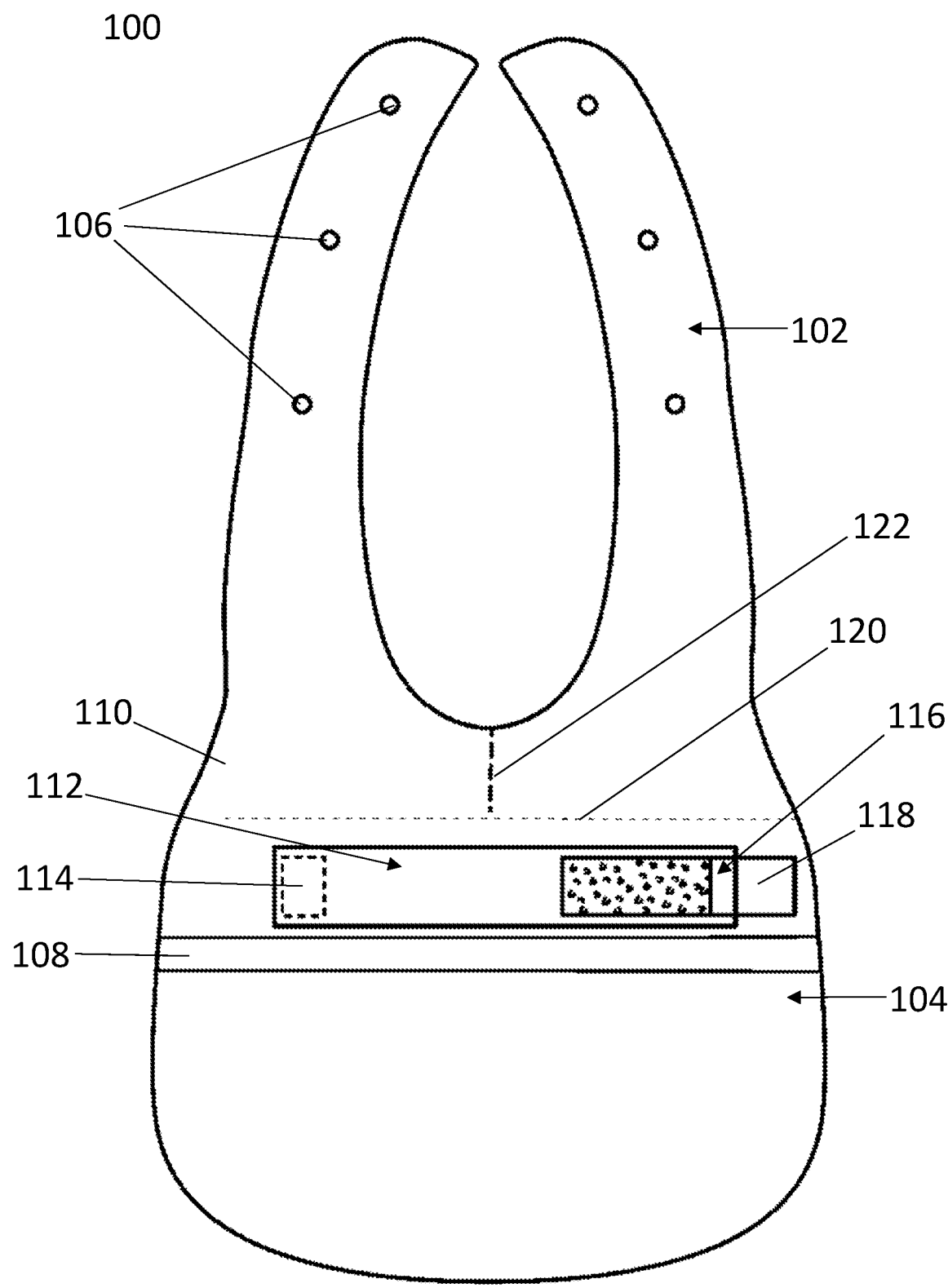
FIG. 1 is an exemplary embodiment of a front portion of the bottle holder removable cover.

Turning now to exemplary FIG. 1, FIG. 1 displays an exemplary embodiment of a front portion of a bottle holder removable cover 100. According to an exemplary embodiment, a front portion of a bottle holder removable cover 100 may be prepared in the form of a children's bib with long neck straps, such as straps 102, and may have a large rounded body, such as body 104. In an exemplary embodiment, a front portion of a bottle holder removable cover 100 may be mated to a back portion of a bottle holder removable cover 200, which may be depicted in subsequent figures.

According to an exemplary embodiment, a front portion of a bottle holder removable cover 100 may be formed from a material which may be absorbent, machine-washable, and comfortable to wear. For example, in an exemplary embodiment, a soft cotton blend may be used. Alternatively, another fabric may be used, which may affect the absorbency, washability, and comfort of the product. (For example, it may in some circumstances be desirable to use a less absorbent material which is more readily washable, or which has a longer lifespan, such as may be desired.) Alternatively, another non-fabric material, such as silicone, may be used, if desired, as may composite materials such as silicone-treated cotton.

According to an exemplary embodiment, the straps 102 of a front portion of a bottle holder removable cover 100 may be provided with one or more fasteners or fastening mechanisms. For example, according to an exemplary embodiment, straps 102 may be provided with one or more snap fasteners (such as snap fasteners 106), or may be provided with another type of fastener such as a magnetic fastener, a button fastener, or a hook-and-loop fastener. Any other variations may be used as may be desired; for example, it may be contemplated to forego fasteners entirely and use a set of strings which may be secured by tying them in a knot in a desired position. According to an exemplary embodiment, three snap fasteners 106 may be provided on either side of the neck straps, with one side (for example, the right side) having the male side fasteners and the other side (for example, the left side) having the female side fasteners. The depicted configuration, showing multiple snaps, may allow for parents to be able to adjust the bottle holder to a correct size as their infant grows.

In an exemplary embodiment, the front portion of the bottle holder removable cover 100 may provide a pocket-style or envelope-style closure 108, which may be connected to an internal cavity into which an insert pillow or other padded material may be provided. (The top seam of one exemplary embodiment of an internal cavity may be shown as dotted line 120, which may represent the extent of one exemplary embodiment of the internal cavity. However, other placements of the internal cavity may be understood.) In some exemplary embodiments, an internal cavity may be formed from two overlapping portions of fabric that may be spread open in order to add or remove the pillow insert; the pillow insert may be provided in the space between the overlapping portions of fabric, such as may be desired. (In some exemplary embodiments, it may be desired to have an internal cavity enclosed by another type of closure. For example, according to an exemplary embodiment, a pocket-style or envelope-style closure 108 may instead be a button closure, a snap closure, a hook-and-loop fastener closure, or any other closure such as may be desired.)

In an exemplary embodiment in which a top seam 120 is provided, an insert pillow may, for example, have the same geometry as the internal cavity, and may have a flat top. However, in an alternative exemplary embodiment, a top seam 120 may be eliminated, may be placed further up, or may have a different geometry, and one or more spaces 110 may additionally provided for an insert pillow, if desired.

According to an exemplary embodiment, a front portion of the bottle holder removable cover 100 may further be provided with a seam 122 sewn into the body 104, which may extend from the neck of the body 104 to the base of the body 104. This may create a divot at the top of the body 104, which may create an incline for a bottle to rest on, as well as a secure pocket for the bottle to fit into. (This incline may be shown in more detail in a later figure.)

According to an exemplary embodiment, the front portion of the bottle holder removable cover 100 may be provided with an adjustable elastic strap 112 which may be used to retain a bottle. (In an exemplary embodiment, an adjustable elastic strap 112 may be used to retain other accessories other than a bottle, such as, for example, one or more toys. In another exemplary embodiment, multiple adjustable elastic straps 112 may be provided, which may be used for different purposes if desired.) In the exemplary embodiment shown in FIG. 1, the adjustable elastic strap 112 may be sewn down 114 on the left side of the body 104, securing the adjustable elastic strap 112 to the body 104. In another exemplary embodiment, the adjustable elastic strap 112 may be secured to the body 104 through any other securing method, such as, for example, adhesive.

According to an exemplary embodiment, the adjustable elastic strap 112 may be secured on the other end by a hook-and-loop fastener closure 116 or another removable closure, such as may be desired. In an exemplary embodiment, the hook-and-loop fastener closure 116 may include a hook portion which is secured to the adjustable elastic strap 112 and a loop portion which is secured to the body 104. (In an exemplary embodiment, each of the hook portion and the loop portion may be secured by sewing, by adhesive, or by another securing method such as may be desired.) In an exemplary embodiment, a hook-and-loop fastener closure 116 may be provided with a pull tab 118, which may allow the adjustable elastic strap 112 to be easily separated from the body 104, separating the hook portion of the hook-and-loop fastener 116 and the loop portion of the hook-and-loop fastener 116. In an exemplary embodiment, the overall effect of the adjustable elastic strap 112 may be to allow a user to wrap the adjustable elastic strap 112 around a bottle (or other object) and secure it with the hook-and-loop fastener 116 at varying lengths, thereby accommodating any bottle size or shape. (It may of course be contemplated that alternative band types, fasteners, placements, and the like may be used.)

Figure 2A:
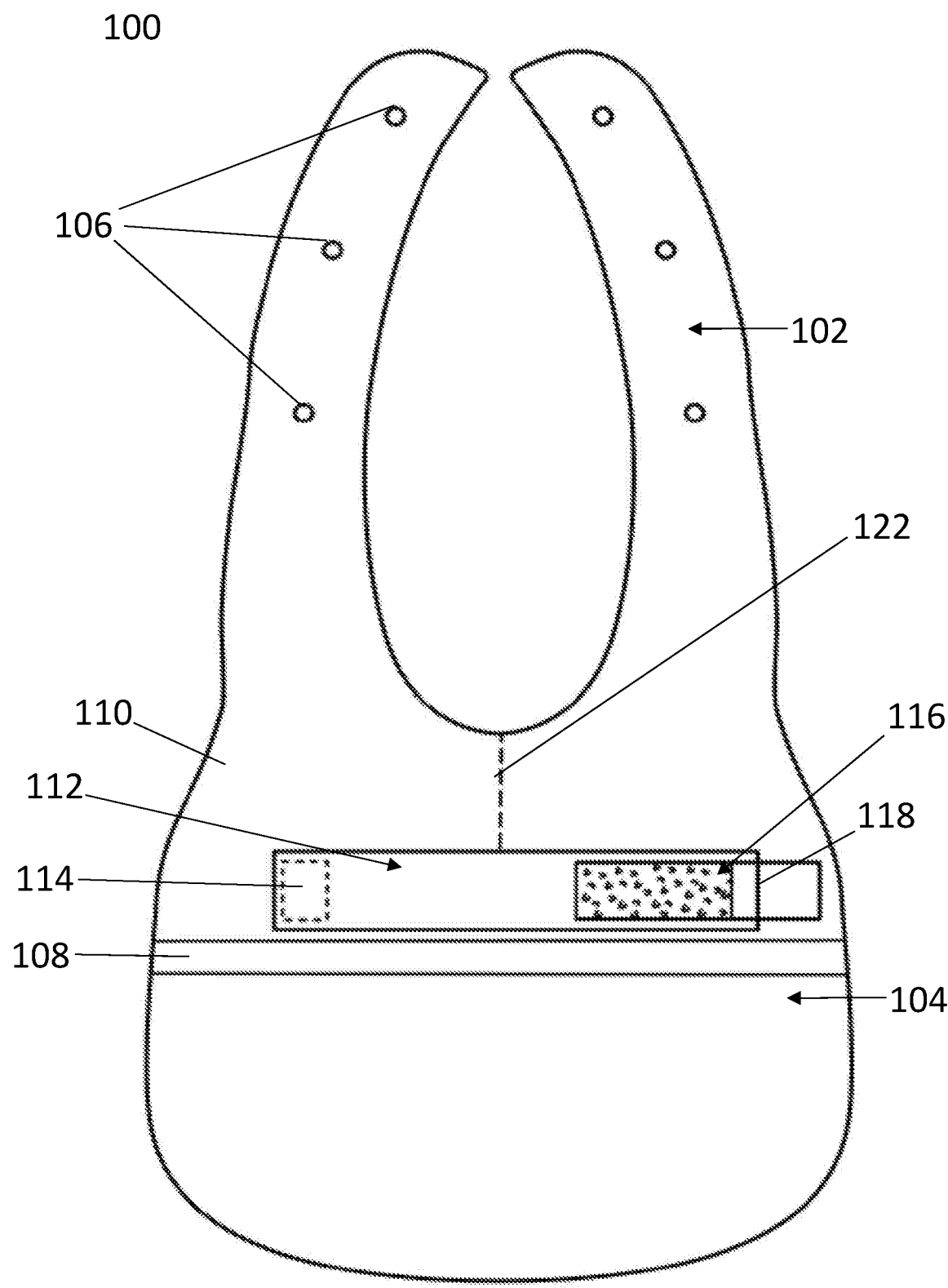
FIG. 2A is an exemplary embodiment of a variation of the front portion of the bottle holder removable cover.

Turning next to exemplary FIG. 2A, FIG. 2A shows a variation on the front portion of the bottle holder removable cover 100 shown in FIG. 1. According to an exemplary embodiment, the front portion of the bottle holder removable cover 100 may have a seam 122 sewn into the body 104, which may be of arbitrary length and configuration and may thus create an arbitrary incline. For example, in an exemplary embodiment, a seam 122 may extend downward past the point at which the adjustable elastic strap 112 may be disposed. It is further noted that, in the embodiment shown in FIG. 2A, no top seam 120 of the internal cavity may be provided, which may have the effect of creating a U-shaped internal cavity with spaces 110 on either side of the provided seam 122; as such, according to an exemplary embodiment, the front portion of the bottle holder removable cover 100 shown in FIG. 2A may accommodate a U-shaped pillow rather than a flat-topped pillow. Other variations on an internal cavity and on a pillow (or other padding) to be provided in a front portion of the bottle holder removable cover 100 may be understood.

Figure 2B:
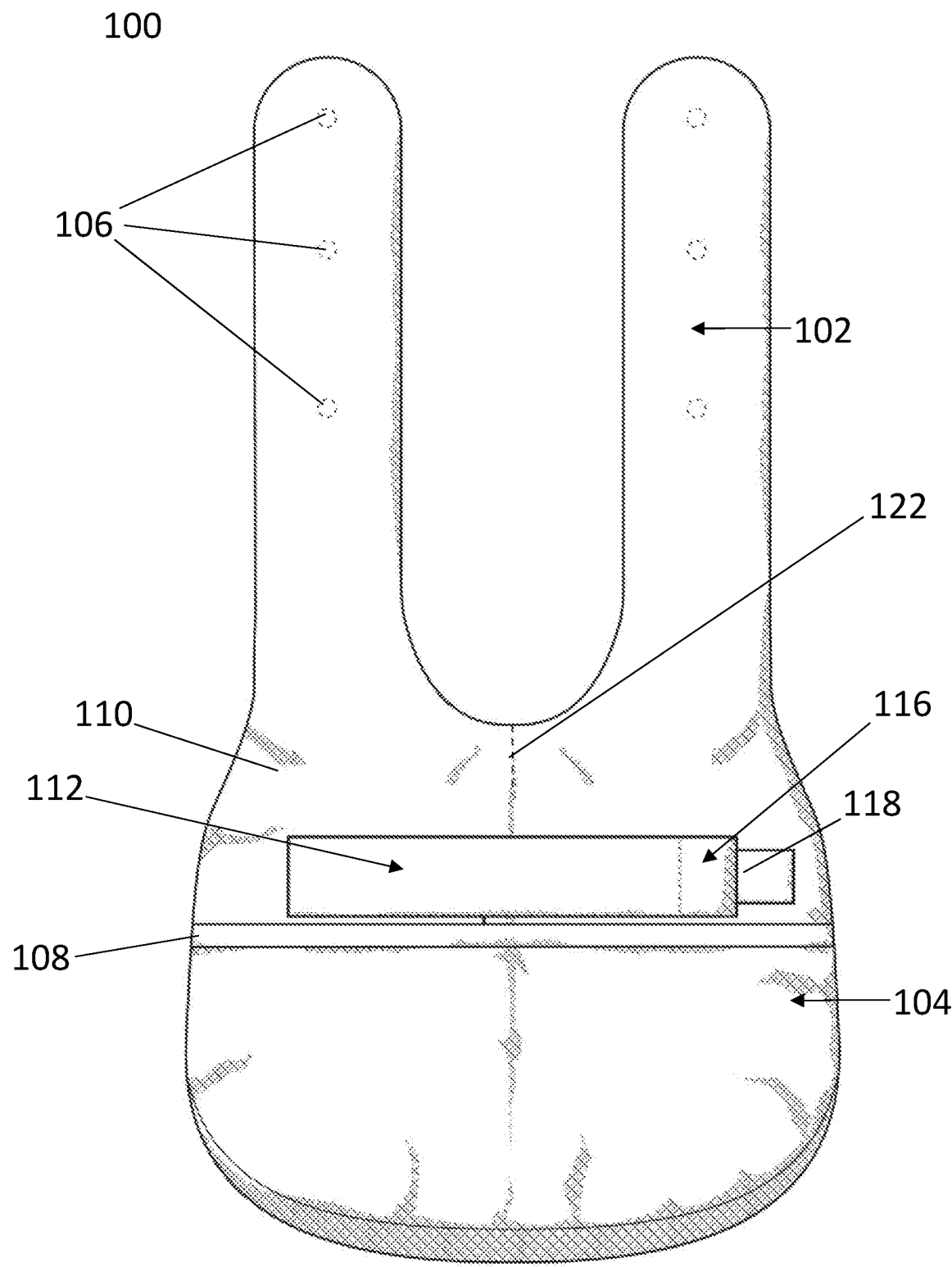
FIG. 2B is an exemplary embodiment of a variation of the front portion of the bottle holder removable cover.

Turning next to exemplary FIG. 2B, FIG. 2B shows a variation on the front portion of the bottle holder removable cover 100 shown in FIG. 1. According to an exemplary embodiment, the front portion of the bottle holder removable cover 100 may have a seam 122 sewn into the body 104, which may be of arbitrary length and configuration and may thus create an arbitrary incline. Further, just as in the exemplary embodiment shown in FIG. 2A, in the exemplary embodiment shown in FIG. 2B, no top seam 120 of the internal cavity may be provided, which may have the effect of creating a U-shaped internal cavity with spaces 110 on either side of the provided seam 122. As such, according to an exemplary embodiment, the front portion of the bottle holder removable cover 100 shown in FIG. 2B may accommodate a U-shaped pillow rather than a flat-topped pillow. Just as is the case with the exemplary embodiment shown in FIG. 2A, in FIG. 2B, other variations on an internal cavity and on a pillow (or other padding) to be provided in a front portion of the bottle holder removable cover 100 may be understood.

Looking further at FIG. 2B, FIG. 2B shows that there may be some level of variation in the size or shape of the front portion of the bottle holder removable cover 100, or in the size and shape of any of the features provided on the front portion of the bottle holder removable cover 100. For example, according to an exemplary embodiment, it may be contemplated to provide the straps 102 such that, instead of the straps 102 each having an inward curve so as to allow the straps 102 to be joined together more easily, the straps 102 may extend vertically from the top portion of the bottle holder removable cover. Other variations of the straps 102 may also be contemplated. For example, according to an exemplary embodiment, one of the straps 102 may be much longer than the other strap 102, such that the longer strap can extend fully around the neck of a baby and connect to the shorter strap on one side of the neck rather than in the rear of the neck. (In some exemplary embodiments, it may even be contemplated to have just one strap 102, which may extend fully around the neck of a baby and may be coupled to the front portion of the bottle holder removable cover 100, or to the rear portion of the bottle holder removable cover 200 or to any other location, such as may be desired. Other coupling mechanisms may also be contemplated; for example, it may be desired to have removable straps 102 that may be substituted for other straps 102 of different sizes or shapes, or even removed entirely in some circumstances. For example, in one variation, it may be desired to couple a bottle holder to the straps of a car seat during a longer road trip, so that a baby can enjoy the advantages of the bottle holder without restricting the baby with overlapping straps.)

Figure 3:
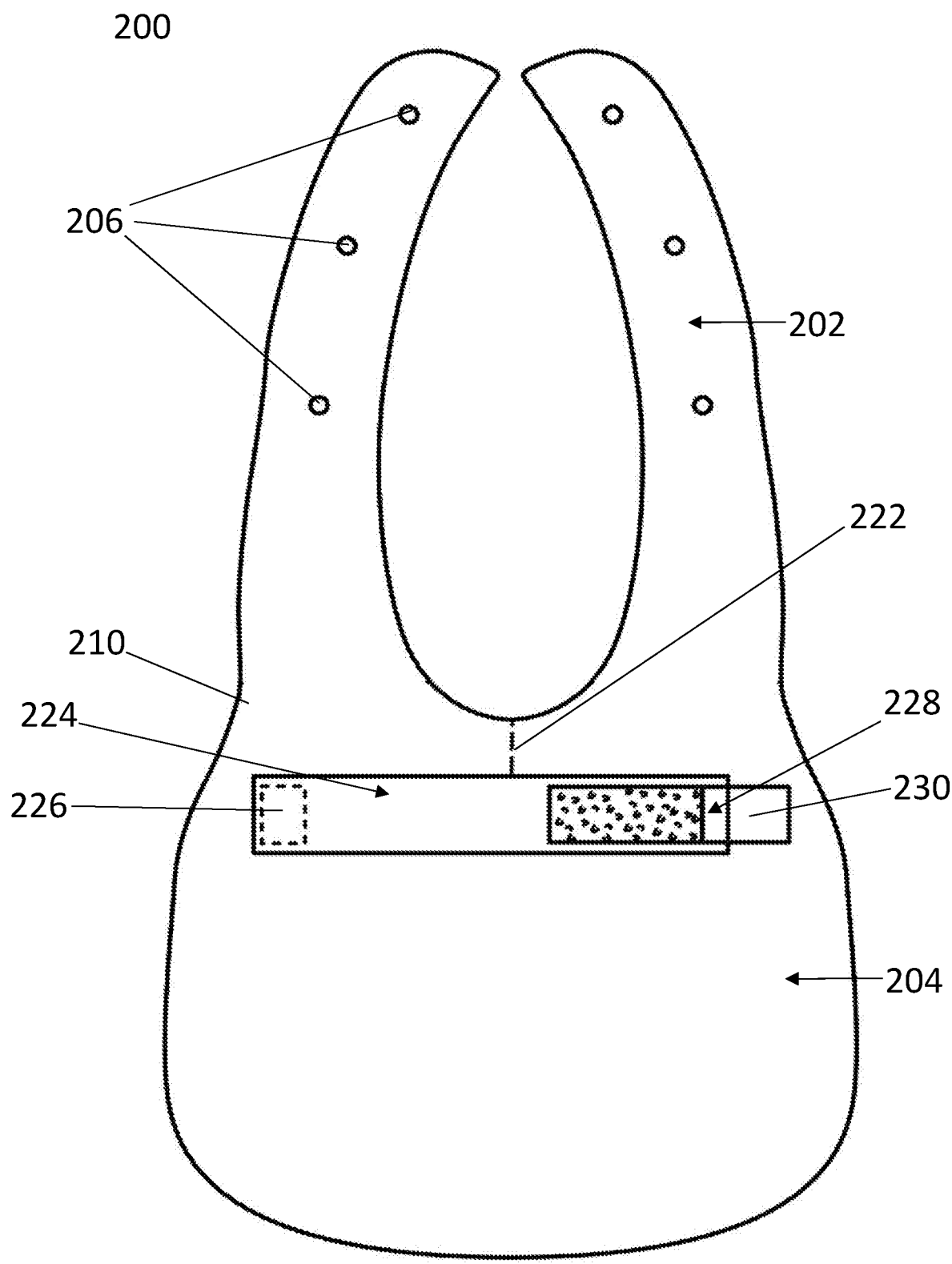
FIG. 3 is an exemplary embodiment of a back portion of the bottle holder removable cover.

Turning next to exemplary FIG. 3, FIG. 3 shows a rear portion of the bottle holder removable cover 200. According to an exemplary embodiment, the rear portion of the bottle holder removable cover 200 may likewise have straps 202 with closures 206, which may for example be the same closures 106 as depicted in FIGS. 1 and 2, and may likewise have a body 204. The body 204 may feature an adjustable elastic strap 224, which may be fixedly coupled on one side by sewing 226 (or otherwise may be attached to the body 204) and may be removable coupled on the other side, such as by a hook-and-loop closure 228 with a pull tab 230. (In an exemplary embodiment, this adjustable elastic strap 224 may have a different configuration as compared to the one provided on the front portion of the bottle holder removable cover 100; for example, an adjustable elastic strap 224 provided on the back portion may be placed higher on the body in order to accommodate shorter, wide-mouth bottles. In an exemplary embodiment, the rear side of the bottle holder removable cover 200 may likewise have a seam 222 forming the divot that had been previously discussed.

Figure 4:
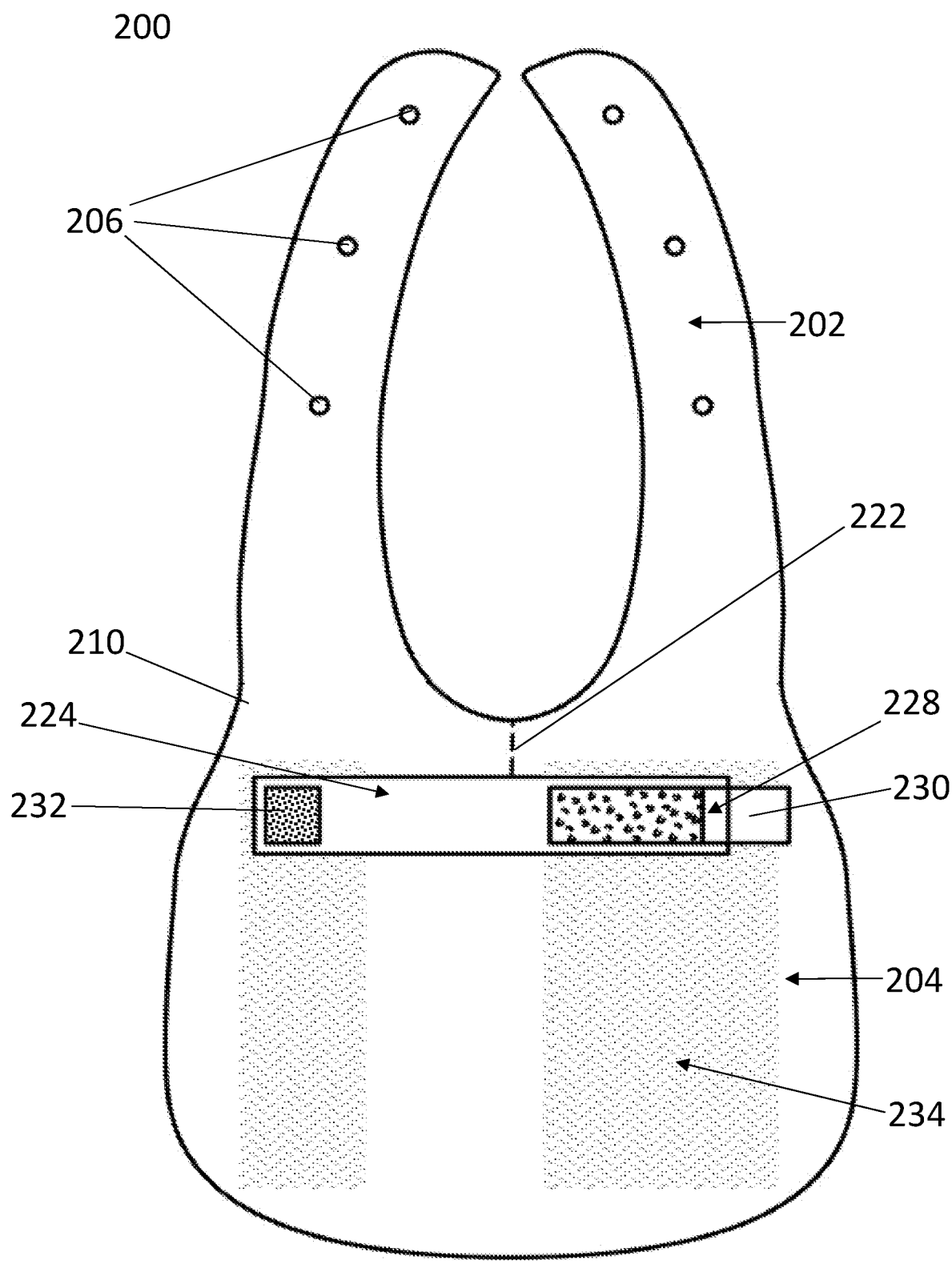
FIG. 4 is an exemplary embodiment of a variation of the back portion of the bottle holder removable cover.

Turning next to exemplary FIG. 4, FIG. 4 shows an alternative exemplary embodiment of a back portion of the bottle holder removable cover 200. In an exemplary embodiment, it may be contemplated to have the bottle holder removable cover 200 have more than one position to which an adjustable elastic strap 224 can be coupled. This may, for example, allow for the placement of an adjustable elastic strap 224 in various positions or at various angles, in order to better position it for a baby's use (or for the use of some other party such as a caregiver). For example, in an exemplary embodiment, an adjustable elastic strap 224 may be adjusted so that it is further to the left, further to the right, further to the top, or further to the bottom, in order to better accommodate the needs of a particular baby. (In some exemplary embodiments, it may also be desired to adjust the placement of the adjustable elastic strap 224 based on the placement of the baby; for example, a different position may be desired when the baby is being held, when the baby is in a car seat, when the baby is in a bouncer seat, when the baby is in a stroller, or when the baby is in some other position such as may be desired. For example, it may be desired to position an adjustable elastic strap 224 such that a bottle is accessible even when the baby is strapped into a car seat, and as such the adjustable elastic strap 224 may be adjustable so that the adjustable elastic strap 224 can be moved to a position where it is not obstructed by the straps of the car seat. As car seats may have different placement of their straps depending on the brand and model of the car seat, the adjustable elastic strap 224 may be adjustable in placement in order to ensure its compatibility with a wide variety of car seats. Other variants may also be contemplated; for example, in an exemplary embodiment, it may be desirable to couple a bottle holder removable cover 200 to a strap of some other carrier device, such as a car seat or stroller, in order to ensure that the bottle holder removable cover 200, and thus an adjustable elastic strap 224 of the bottle holder removable cover 200, is maintained in a constant position with respect to the carrier device, if desired. This may be accomplished by one or more fasteners linking the carrier device and the bottle holder removable cover 200, an additional adjustable elastic strap 224 that is placed over a strap of the car seat or other carrier device to secure the bottle holder removable cover 200 to the strap of the carrier device, or by some other arrangement such as may be desired.)

Likewise, in some exemplary embodiments, an adjustable elastic strap 224 may be adjusted so that it is provided at an angle, such as an upwards or downwards angle, so that an optimal position can be selected. This may potentially make it easier for a baby to withdraw a bottle held in the adjustable elastic strap 224 from one side, as opposed to the other, which may help in the use of the bottle holder removable cover 200 as a training tool to teach babies to learn how to use their hands to manipulate and control the bottle holder on their own. Alternatively, this may allow the adjustable elastic strap 224 to position certain bottles in a correct position that would not necessarily be achieved by an adjustable elastic strap 224 provided in a straight and level position. (For example, certain bottles may have side handles, which may provide an ergonomic surface that a baby can grab in order to enhance its grip on the bottle. The adjustable elastic strap 224 may be provided such that it extends under the handle of the bottle on one side, allowing the handle to be easily gripped from that side, which may in turn allow the bottle to be much more easily withdrawn from that side of the adjustable elastic strap 224.) Likewise, the angle of an adjustable elastic strap 224 may be adjusted in order to better accommodate a strap of another device.

In other exemplary embodiments, an adjustable elastic strap 224 may be exchanged for an adjustable elastic strap 224 of a different size or shape, or for multiple adjustable elastic straps 224, such as may be desired. For example, according to an exemplary embodiment, it may be desired to have an adjustable elastic strap 224 that has a different thickness, length, or shape, or an adjustable elastic strap 224 that has different properties like different levels of elasticity or even a different color or pattern. (In some exemplary embodiments, this may also allow for easy personalization of the bottle holder removable cover 200 to a particular baby, if such is desired; for example, an adjustable elastic strap 224 may be added that is provided with the baby's name.) For example, in one exemplary embodiment, a thicker adjustable elastic strap 224 designed for optimal retention of a bottle during an initial feeding stage (when the baby is not going to be trying to retrieve, manipulate, and control the bottle on their own) might be substituted for a thinner adjustable elastic strap 224 with a small curve in it, or which has a thinner middle portion and thicker outer portions, which may make it easier for the baby to put the bottle back in the adjustable elastic strap 224 when they are finished using it. This may make it easier for the baby to retrieve, manipulate, control, and replace the bottle on their own.

In an exemplary embodiment, an adjustable elastic strap 226 may be coupled to a bottle holder removable cover 200 by the use of a hook-and-loop fastener combination. For example, a bottle holder removable cover 200 may be provided with a loop portion 234 of a hook-and-loop fastener combination, and an adjustable elastic strap 224 may be provided with the hook portion 232 of a hook-and-loop fastener combination, such that the hook portion 232 of the adjustable elastic strap 224 can be applied on the loop portion 234 or loop field in a desirable position. (In an exemplary embodiment, the hook portion 232 of an adjustable elastic strap 224 that is intended to be stationary may have a much higher peel strength than the hook-and-loop closure 228 on the other side of the adjustable elastic strap 224. This may allow hook portion 232 to be used for securing and anchoring the adjustable elastic strap 224, while the hook-and-loop closure 228 on the other side of the adjustable elastic strap 224 may be removed and replaced as desired.)

Figure 5:
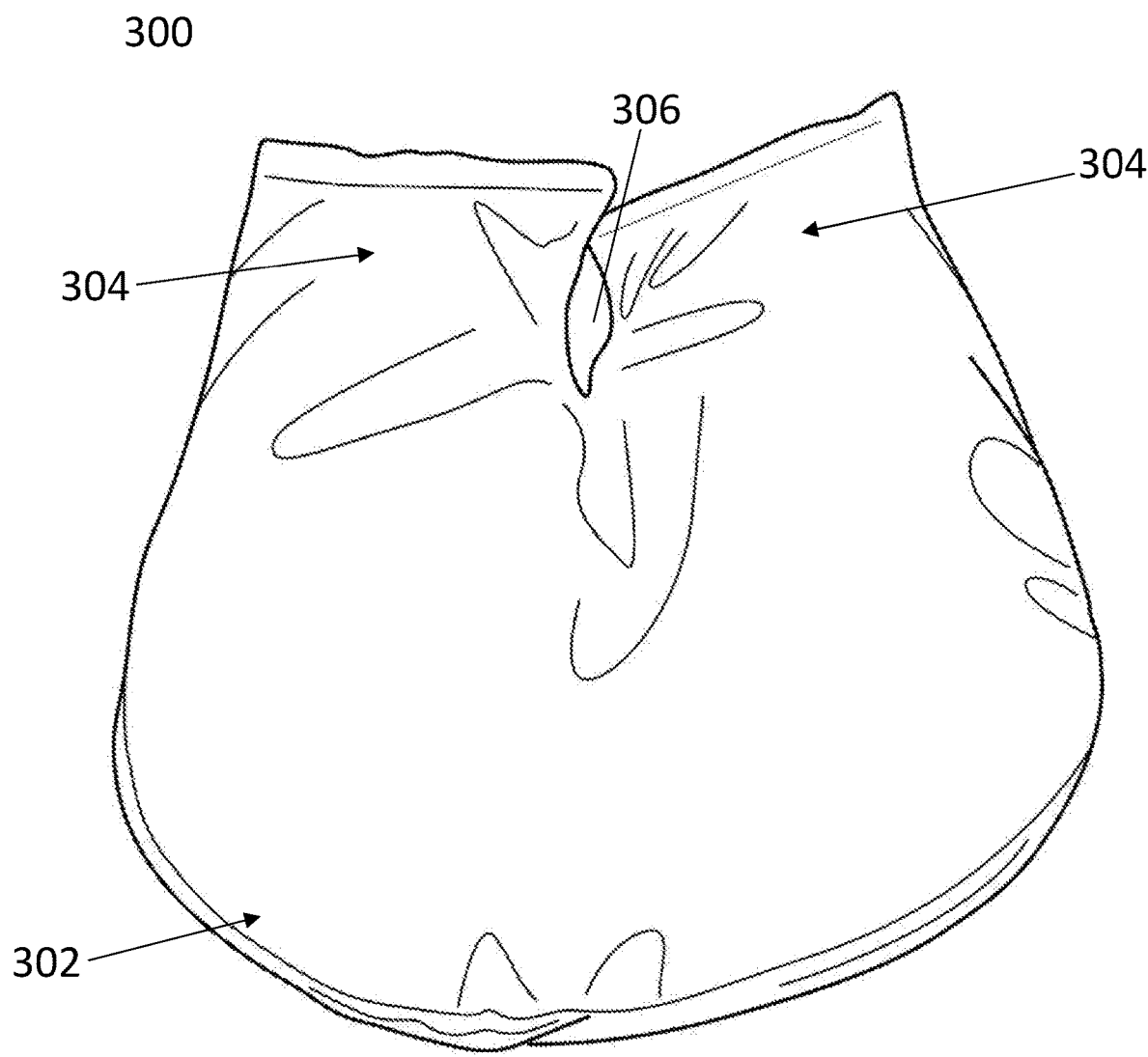
FIG. 5 is an exemplary embodiment of an insert pillow of a bottle holder.

Turning next to exemplary FIG. 5, FIG. 5 is an exemplary embodiment of an insert pillow 300 of a bottle holder. According to an exemplary embodiment, an insert pillow 300 may have a body 302, as well as upper portions 304 separated by a narrow opening 306. According to an exemplary embodiment, an insert pillow 300 of a bottle holder may be provided so that the body 302 of the insert pillow 300 is provided within the body of the bottle holder removable cover, and such that the narrow opening 306 is provided approximately where the seam or divot is provided on the bottle holder removable cover, allowing the insert pillow 300 to be placed within the bottle holder removable cover in such a fashion that the upper portions 304 are provided on either side of the seam or divot.

According to an exemplary embodiment, each of the upper portions 304 may be provided with an angled gusset, such that the upper portions 304 are less thick than the body 302 of the insert pillow 300. This may ensure that the overall effect of the insert pillow 300 is to be thicker at the bottom than at the top, which may cause the bottle to be consistently held at a particular angle when positioned on the bottle holder. (It may be desirable to hold the bottle at a consistent angle in this manner for feeding purposes.) Alternatively, in an exemplary embodiment, an insert pillow 300 may have any other shape, such as is necessary to conform to the inner portion of the bottle holder removable cover; for example, it may be contemplated to have the insert pillow 300 have a uniform thickness, in order to ensure that all parts of the baby are equally padded by the pillow 300. In still another exemplary embodiment, it may be contemplated to have the insert pillow 300 be filled with loose material such that it can easily adjust to the shape of the bottle holder removable cover. (In an exemplary embodiment, the bottle holder removable cover may have an inner portion that is more expandable in an area corresponding to the body portion 302 of the insert pillow 300, ensuring that, when the insert pillow 300 is added into the bottle holder removable cover, the insert pillow 300 is thicker in this area than near the top portion.)

According to an exemplary embodiment, an insert pillow 300 may be formed from a stain-resistant and/or water-resistant material. For example, in an exemplary embodiment, an insert pillow 300 may be formed from a stain-resistant and water-resistant polyester material, such as STAYCLEAN polyester microfiber. In another exemplary embodiment, an insert pillow 300 may be provided with a stain-resistant and water-resistant coating, such as a TEFLON coating. Other variations on an insert pillow 300 may also be contemplated; for example, it may in some exemplary embodiments be desirable to provide an insert pillow 300 which is not stain-resistant or water-resistant (or which is not wholly stain-resistant or water-resistant) but which is easy to wash. (For example, an insert pillow 300 may have a cover which may absorb stains, and may have removable stuffing provided within the insert pillow 300, such as foam stuffing. When it is necessary to wash the insert pillow 300, the stuffing may be removed from the insert pillow 300 and the insert pillow 300 may be washed as if it were any other fabric article.)

In an exemplary embodiment, an insert pillow 300 may be adjustable in size or shape. For example, according to an exemplary embodiment, an insert pillow 300 may be openable so that varying amounts of stuffing can be placed within it; for example, the stuffing in an insert pillow 300 may be foam blocks of different sizes, which may be removed and replaced with others if desired. Different sizes, shapes, and so forth of insert pillow 300 may also be contemplated, as may different fills for the insert pillow 300; for example, in an exemplary embodiment, an inflatable pillow may be used.

Figure 6:
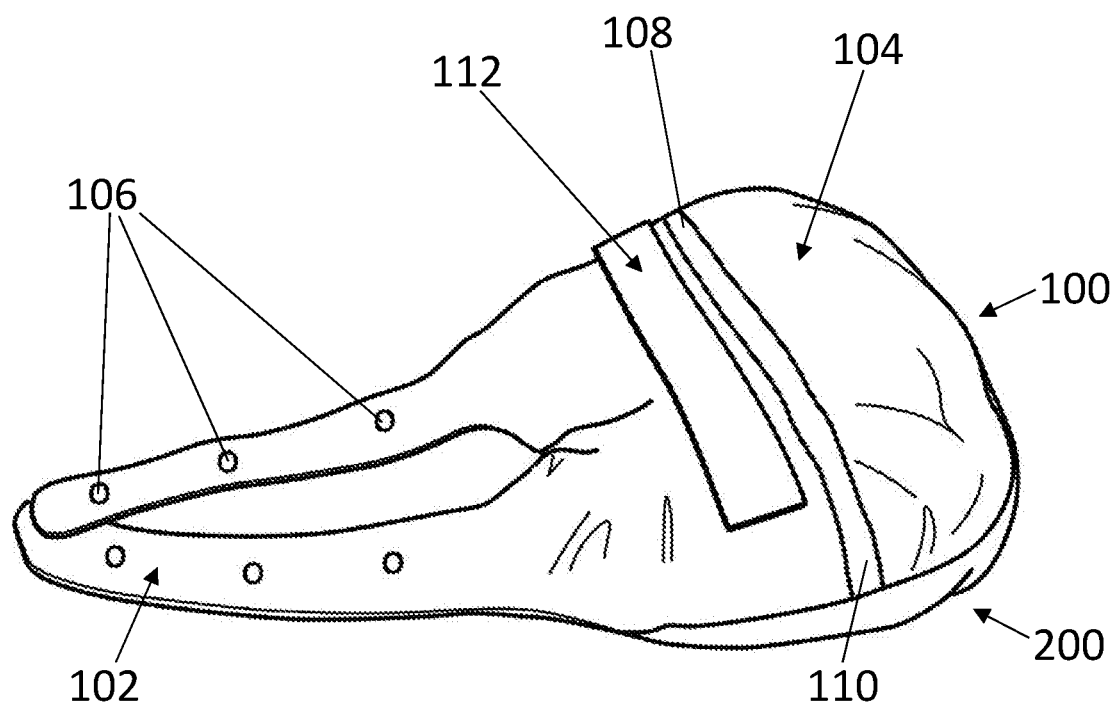
FIG. 6 is an exemplary embodiment of a side view of a bottle holder.

Turning now to exemplary FIG. 6, FIG. 6 is an exemplary embodiment of a side view of a bottle holder 400. In the exemplary embodiment shown in FIG. 6, a front portion 100 of the bottle holder removable cover and a rear portion 200 of the bottle holder removable cover may be provided, with an insert pillow provided between them. According to an exemplary embodiment, the bottle holder 400 may be provided with straps 102 intended to be placed around the neck of a baby (which may have fasteners 106 provided thereupon), and may have a body 104 having a closure 108 which may, when opened, expose the internal cavity in which an insert pillow may be disposed. That internal cavity may be indicated as element number 110. The bottle holder 400 may also have an adjustable strap 112 provided on the front portion thereof, in which one or more bottles may be disposed. (According to an exemplary embodiment, an adjustable strap 112 such as depicted herein may not have a removable closure, which may ensure that a baby wearing the bottle holder 400 cannot accidentally rip off one side of the adjustable strap 112, dropping any bottle held within it. In an exemplary embodiment, this may be provided by an adjustable strap 112 with each end fixed in place, or may be provided by an adjustable strap 112 with each end secured by a hard-to-remove closure such as a magnet or strong hook-and-loop connector, such as may be desired. This may optionally allow the adjustable strap 112 to be removed and substituted with a different adjustable strap, such as may be desired.)

Figure 7:
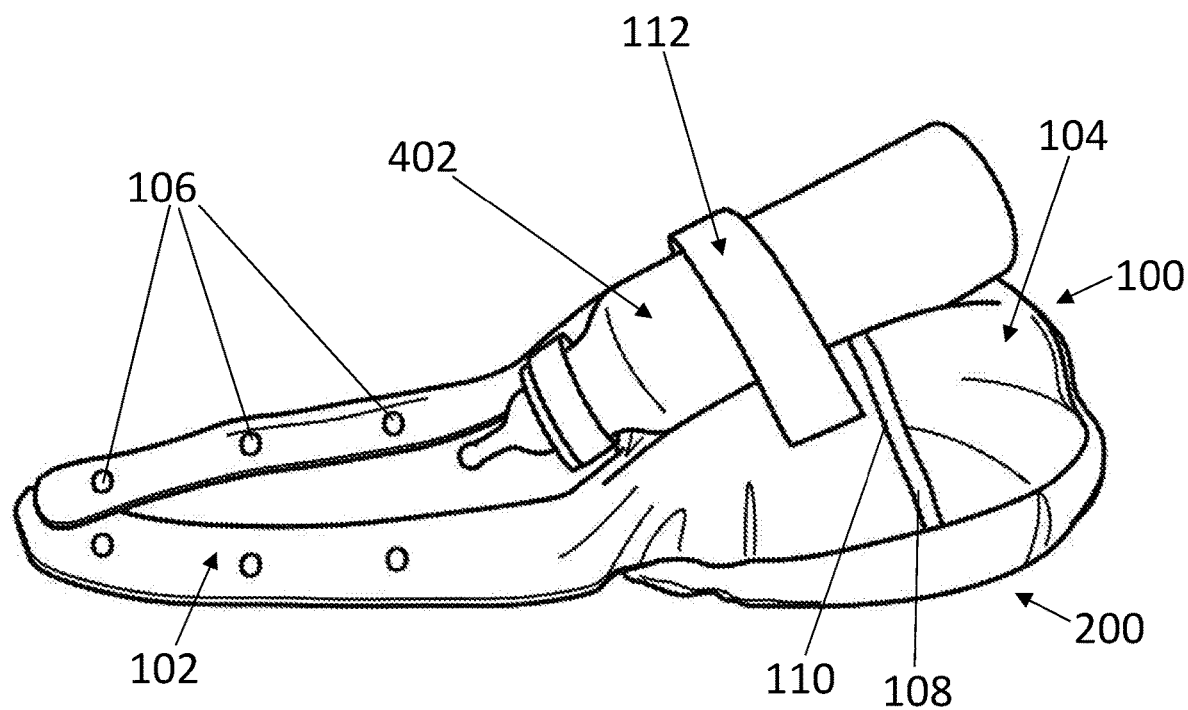
FIG. 7 is an exemplary embodiment of a side view of a bottle holder, in this case having a bottle inserted in the bottle holder.

Turning next to exemplary FIG. 7, FIG. 7 is an exemplary embodiment of a side view of a bottle holder 400, in this case having a bottle 402 inserted in the bottle holder 400. According to an exemplary embodiment, a bottle 402 may be positioned such that it may be used for feeding, and may optionally be removable from an elastic strap 112, such as may be desired. For example, in the exemplary embodiment shown in FIG. 7, the bottle 402 may be provided such that it may be disposed at a consistent angle for feeding by an infant wearing the bottle holder 400, based on the insert pillow being thicker at the bottom and having the divot disposed in the top portion.

Figure 8:
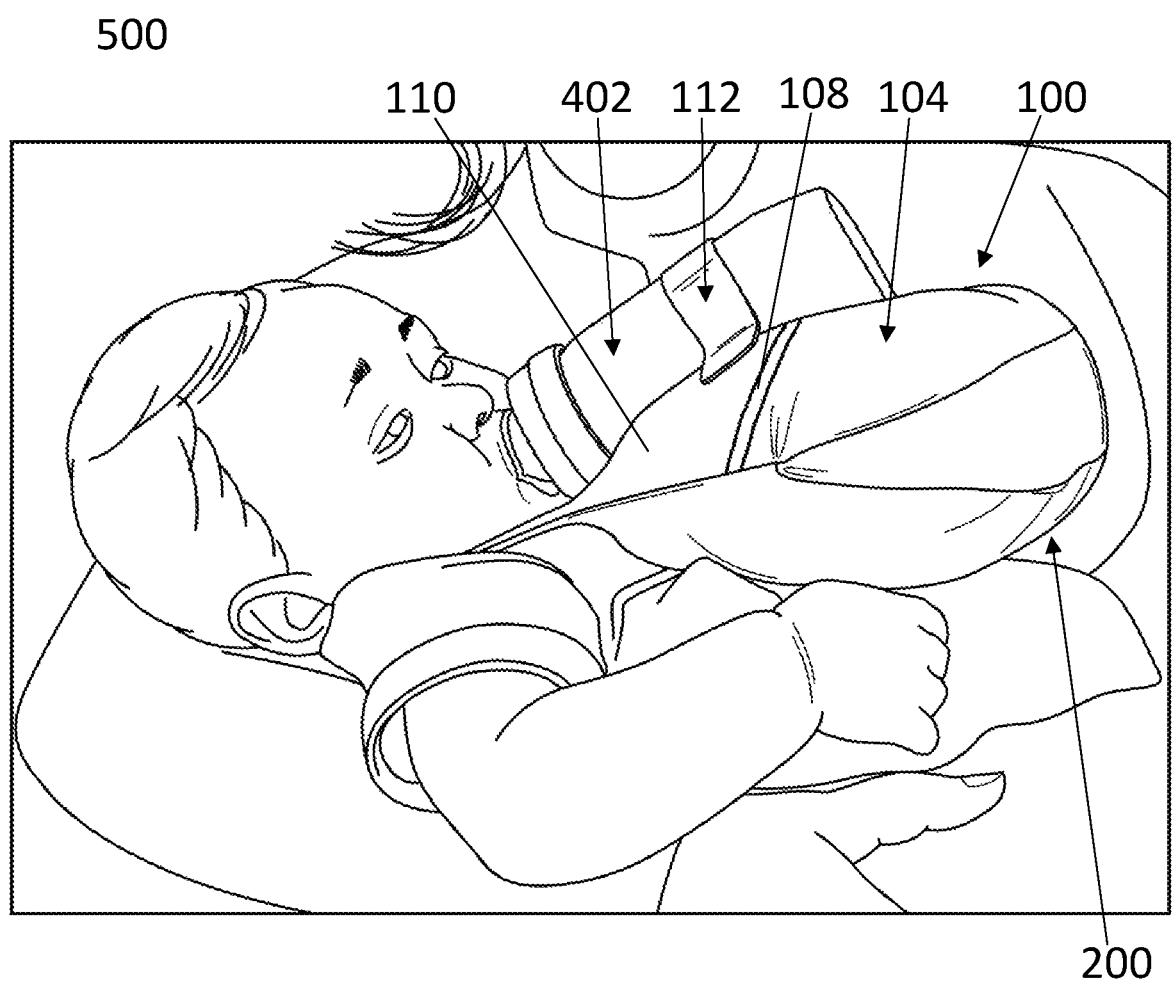
FIG. 8 is an exemplary embodiment of a bottle holder as shown in use.

Turning next to exemplary FIG. 8, FIG. 8 displays an exemplary embodiment of a bottle holder 500 as shown in use. As noted above, the bottle 402 may be provided at a consistent angle for feeding by the bottle holder 500, such that an infant can feed from the bottle 402 whenever they are wearing the bottle holder 500. In an exemplary embodiment, the adjustable strap 112 and the bottle 402 may each be provided within arm's reach of the infant, such that, when desired, the infant can retrieve or replace their bottle in the strap 112 (or can have a caretaker replace the bottle in the strap 112). The bottle holder 500 may also provide cushioning between the infant and the bottle 402, ensuring comfort.

According to an exemplary embodiment, in order to use a bottle holder 500 in its configuration as a hands-free feeding bib, the bottle holder 500 may be secured around a baby's neck in a comfortable position. When the baby is placed in a reclined position, the elastic strap 112 can be opened by removing a free end from where it is connected to the bottle holder 500 by a connector (or, alternatively, the elastic strap 112 can be stretched if both ends are fixed to the bottle holder 500, as may be the case in some exemplary embodiments) and a baby bottle 402 may be placed into a seam area or divot of the bottle holder 500. The elastic band 112 may then be tightened around the bottle holder 500, either by reattaching the elastic band 112 or by releasing the stretched elastic band 112, or otherwise by tightening it such as may be desired. (For example, in some exemplary embodiments, it may be desired to use a method of tightening the elastic band 112 other than the use of elastic; for example, in an exemplary embodiment, the elastic band 112 may be tightenable by using a drawstring or similar configuration. In some exemplary embodiments, the elastic band 112 may not be elastic at all, and may be tightened or loosened entirely by this other mechanism; it may also be desirable to have the bottle holder 500, rather than the elastic band 112 or in addition to the elastic band 112, be constructed of some elastic or readily deformable material.) The use of the elastic band 112 and the seam or divot to secure the bottle 402 may ensure that the bottle does not shift during feeding or does not shift by more than an acceptable amount, but may still allow the bottle 402 to be slid forward or backward until it is in a comfortable position for the child to begin eating.

In an exemplary embodiment, it may be contemplated that, even if the baby does not need to hold the bottle 402 during feeding (or even if a caregiver does not need to hold the bottle 402 during feeding), they may wish to do so. (For example, it may make the baby or the caregiver more comfortable to keep a hand on the bottle 402 while feeding is taking place, or the baby may wish to explore the object that they are feeding from by using their hands.) In an exemplary embodiment, the bottle holder 500 may allow for easy minor adjustments of the position of the bottle 402, so that if the bottle holder 500 is not holding the bottle 402 in the correct position, a caregiver may minorly adjust the straps in order to allow the bottle 402 to be reoriented into a better position, or may use another elastic strap 112 (such as a strap on the rear portion 200 of the bottle holder 500) in order to hold the bottle 402.

Figure 9:
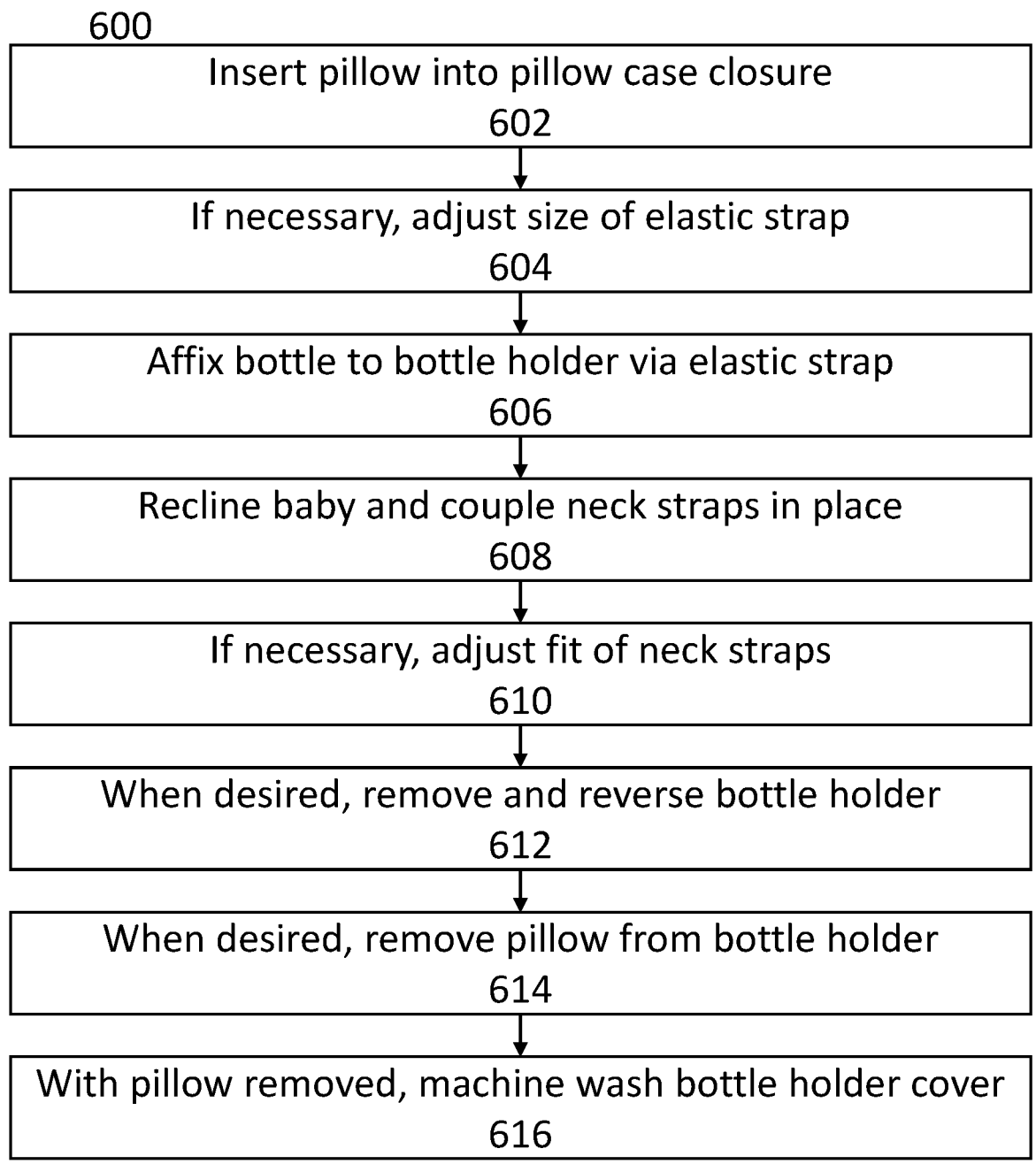
FIG. 9 is an exemplary flowchart depicting an exemplary embodiment of a method of using a bottle holder.

Turning now to exemplary FIG. 9, FIG. 9 is an exemplary flowchart depicting an exemplary embodiment of a method of using a bottle holder 600. According to an exemplary embodiment, in a first step 602, an insert pillow may be inserted into the pillow case closure provided on the front side of the bottle holder (or elsewhere on the bottle holder), optionally after having washed the pillow or after having wiped down the pillow with a damp cloth if it is a variant wherein no machine washing is required. In a next step 604, the size of the elastic strap may be adjusted, if desired. (For example, a fixed elastic strap may be adjusted so that a hook-and-loop closure or other closure is attached to the bottle holder at a different position, thereby adjusting the size of the elastic strap. Alternatively, the elastic strap may be substituted for a different elastic strap, if desired.)

In a next step 606, a bottle may be disposed in the bottle holder by the elastic strap. This may involve, for example, stretching the elastic strap until it can accommodate the bottle, then disposing the bottle within the elastic strap, or may involve, for example, removing one of the closures of the elastic strap so that the bottle can be disposed within the elastic strap. Other variants may also be contemplated, such as may be desired.

In a next step 608, the baby may be held in a reclined position (if desired) and the neck straps of the bottle holder may be coupled around the head of a baby. For example, according to an exemplary embodiment, the neck straps may be coupled by a closure around the head of the baby at an appropriate location, with a corresponding closure in a plurality of closures being selected. Other variants may also be contemplated; for example, in an exemplary embodiment, a removable cover may be provided that has the neck straps already linked, so that no coupling of them needs to be done.

In a next step 610, the fit of the neck straps may be adjusted, if desired. In an exemplary embodiment, this may involve, for example, unsnapping a linking closure of the set of neck straps and snapping a different linking closure of the set of neck straps. Alternatively, other variants of a neck strap that may be tightened or loosened may be contemplated.

In a next step 612, a bottle holder may be removed and reversed such as may be desired. For example, according to an exemplary embodiment, once the child has reached a certain age or certain stage of development, they may start using their hands to manipulate and control a bottle on their own, and as such the bottle holder (or its removable cover) may be removed and replaced such that an elastic band provided on the other side of the bottle holder may be face-up and may be immediately available to the child. This may allow a more appropriate elastic band (or, for example, a more appropriate connector configuration) to be used, such that the bottle is provided in a different position or is more accessible to the child. (For example, the elastic band on the back side of the bottle holder may be provided in a higher position than the elastic band on the front side of the bottle holder, in order to make it easier to retrieve.)

Other variations, such as variations in what connectors are used, may also be contemplated. (In an exemplary embodiment, it may even be desired to have the type of connectors be deliberately varied as part of the bottle holder's use as a training tool, and adjustable straps may be available with all types of fasteners, even if those fasteners need to be stuck onto the bottle holder via another type of fastening mechanism. For example, according to an exemplary embodiment, a bottle holder may be provided with areas having the loop ends for a hook-and-loop fastener. It may be desired to have an adjustable strap use a button connection, so that the child can learn or practice how to undo a button. A first part of the adjustable strap may include a hook portion of a hook-and-loop connector at the base end of a strap and a button hole connector at the other end of the strap. A second part of the adjustable strap may include a button, provided on a fabric patch having a hook portion of a hook-and-loop connector. The button-hole-equipped strap may be affixed to the bottle holder via hook-and-loop connection at one position on the bottle holder, and the button may be affixed to the bottle holder via hook-and-loop connection at another position on the bottle holder, such that the button hole can be brought into contact with and attached to the button. Other variations on this concept may also be understood, and various fasteners may be used on both a strap and on the base of a strap and a connector; for example, in one exemplary embodiment, it may be contemplated to have a strap that uses hook-and-loop fasteners be coupled to a bottle holder by a snap fit.

In a next step 614, a pillow may be removed from a bottle holder. In an exemplary embodiment, the pillow (and the internal portion of the bottle holder removable cover, if desired) may then be cleaned. According to an exemplary embodiment, a pillow may be stain-resistant and water-resistant, allowing the pillow to be cleaned easily though the use of a damp cloth. According to another exemplary embodiment, the pillow may be machine-washable, if desired.

In a next step 616, with the pillow removed (as per step 614), the bottle holder cover may be washed, such as by machine washing. This may allow the bottle holder cover to be easily cleaned. (According to an exemplary embodiment, the bottle holder cover may be washed with a pillow inside, if desired, and may even have an integral pillow in exemplary embodiments wherein the pillow may be machine-washed.) Once washed and dried, if the pillow has been removed, the pillow may be replaced. Any other articles, such as removable straps, may also be removed and replaced such as may be desired.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A bottle holder apparatus for an infant, comprising:
 a bottle holder cover, the bottle holder cover having a front face and a back face, and a hollow body portion disposed between the front face and the back face;
 a plurality of neck straps provided on an upper part of the bottle holder cover, each of the plurality of neck straps comprising a connector configured to be releasably coupled to another of the plurality of neck straps;
 a bottle holder strap having a first and a second end, the bottle holder strap coupled on the first end to the front face of the bottle holder cover and removably couplable on the second end to the front face of the bottle holder cover; and
 a pillow, the pillow provided within the hollow body portion of the bottle holder cover, the pillow providing a sloping rest for a bottle, wherein the bottle holder apparatus has a divot stitch traversing the front face and the back face of the bottle holder cover in an upper part of the hollow body portion, the divot stitch forming a divot in the surface of the body configured to receive a bottle; and
 wherein the pillow has a U-shape, the concave portion of the U-shape comprising a narrow opening disposed in an upper top part of the pillow and configured to interface with the divot stitch such that the divot stitch transects the concave portion of the U-shape.

2. The bottle holder apparatus of claim 1, wherein the front face of the bottle holder cover further comprises an orifice extending into the hollow body portion and configured to receive the pillow therethrough.

3. The bottle holder apparatus of claim 2, wherein the front face of the bottle holder further comprises an envelope closure comprising a first sheet and a second sheet, the first sheet having a lip extending in an overlapping fashion over the second sheet.

4. The bottle holder apparatus of claim 1, wherein the pillow has an angled gusset.

5. The bottle holder apparatus of claim 1, further comprising a second bottle holder strap having a first and a second end, the second bottle holder strap fixedly coupled on the first end to the back face of the bottle holder cover and removably couplable on the second end to the back face of the bottle holder cover.

6. The bottle holder apparatus of claim 5, wherein the second bottle holder strap is placed at a different vertical position on the bottle holder cover than the first bottle holder strap.

7. The bottle holder apparatus of claim 1, wherein the pillow is formed from a stain-resistant and water-resistant material.

8. The bottle holder apparatus of claim 1, further comprising a bottle, the bottle retained by the bottle holder strap and held between the first end and the second end of the bottle holder strap.

9. A method of using a bottle holder apparatus for an infant, the bottle holder apparatus comprising a bottle holder cover with a front face and a back face and a hollow body portion provided between the front face and the back face and adapted to hold a pillow, the bottle holder apparatus further comprising a plurality of neck straps and a bottle holder strap fixedly coupled on at least one end to the front face of the bottle holder cover, wherein the bottle holder apparatus has a divot stitch traversing the front face and the back face of the bottle holder cover in an upper part of the hollow body portion, the divot stitch forming a divot in the surface of the body configured to receive a bottle; and wherein the pillow has a U-shape, the concave portion of the U-shape comprising a narrow opening disposed in an upper top part of the pillow and configured to interface with the divot stitch such that the divot stitch transects the concave portion of the U-shape; the method comprising:
 inserting the pillow into the hollow body portion;
 coupling a bottle to the bottle holder strap; and
 coupling the neck straps in place.

10. The method of claim 9, wherein the step of inserting the pillow into the hollow body portion comprises inserting the pillow through an orifice disposed in the front face of the bottle holder cover, the orifice extending into the hollow body portion and configured to receive the pillow therethrough.

11. The method of claim 10, wherein the front face of the bottle holder further comprises an envelope closure comprising a first sheet and a second sheet, the first sheet having a lip extending in an overlapping fashion over the second sheet, and wherein the method comprises pulling back the first sheet from the second sheet.

12. The method of claim 9, wherein the pillow has an angled gusset, and wherein the step of inserting the pillow into the hollow body portion comprises aligning the angled gusset in a direction of insertion of the pillow.

13. The method of claim 9, further comprising:
 aligning the narrow opening with the stitching when inserting the pillow into the hollow body portion.

14. The method of claim 9, wherein the bottle holder strap is removably couplable on one end, and wherein the step of coupling the bottle to the bottle holder strap comprises:

aligning the bottle so that the bottle rests on the front face of the bottle holder in a direction such that a nipple of the bottle is oriented in a direction below a horizontal axis; and coupling the removably couplable end of the bottle holder strap to the front face of the bottle holder.

15. The method of claim 9, further comprising a second bottle holder strap having a first and a second end, the second bottle holder strap fixedly coupled on the first end to the back face of the bottle holder cover and removably couplable on the second end to the back face of the bottle holder cover, wherein the method comprises:

uncoupling the bottle from the bottle holder strap;

rotating the bottle holder so that the front face is oriented in a backward direction and the back face is oriented in a frontward direction; and coupling the bottle to the second bottle holder strap.

16. The method of claim 15, wherein the second bottle holder strap is placed at a different vertical position on the bottle holder cover than the first bottle holder strap.

17. The method of claim 9, wherein the pillow is formed from a stain-resistant and water-resistant material.

18. The method of claim 9, further comprising removing the pillow through an orifice disposed in the front face of the bottle holder cover, the orifice extending into the hollow body portion and configured to receive the pillow therethrough.

19. A bottle holder apparatus for an infant, comprising:

a bottle holder cover, the bottle holder cover having a front face and a back face, and a hollow body portion disposed between the front face and the back face;

a plurality of neck straps provided on an upper part of the bottle holder cover, each of the plurality of neck straps comprising a connector configured to be releasably coupled to another of the plurality of neck straps;

a bottle holder strap having a first and a second end, the bottle holder strap removably coupled on the first end to the front face of the bottle holder cover by a first removable connection having a first level of strength, and removably couplable on the second end to the front face of the bottle holder cover by a second removable connection having a second level of strength weaker than the first level of strength; and a pillow, the pillow provided within the hollow body portion of the bottle holder cover, the pillow providing a sloping rest for a bottle, wherein the bottle holder apparatus has a divot stitch traversing the front face and the back face of the bottle holder cover in an upper part of the hollow body portion, the divot stitch forming a divot in the surface of the body configured to receive a bottle; and wherein the pillow has a U-shape, the concave portion of the U-shape comprising a narrow opening disposed in an upper top part of the pillow and configured to interface with the divot stitch such that the divot stitch transects the concave portion of the U-shape.

* * * * *